(12) United States Patent
Halvorson

(10) Patent No.: US 7,975,386 B1
(45) Date of Patent: Jul. 12, 2011

(54) INFANT FEEDING SYSTEM

(76) Inventor: Lisa R. Halvorson, Manhattan, KS (US)

(*) Notice: Subject to any disclaimer, the term of this patent is extended or adjusted under 35 U.S.C. 154(b) by 186 days.

(21) Appl. No.: 12/394,319

(22) Filed: Feb. 27, 2009

(51) Int. Cl.
*A47J 43/28* (2006.01)

(52) U.S. Cl. ............... 30/141; 30/324; 222/93; 222/102; 426/115

(58) Field of Classification Search ........... 30/41, 123.3, 30/125, 141, 324; 222/92, 93, 101, 102; 426/115
See application file for complete search history.

(56) References Cited

U.S. PATENT DOCUMENTS

| | | | |
|---|---|---|---|
| 2,252,119 A | | 8/1941 | Edmonds |
| D191,387 S | | 9/1961 | Hansen |
| 3,289,893 A | * | 12/1966 | Vance et al. ............. 222/102 |
| 3,612,358 A | | 10/1971 | Massa |
| 4,091,965 A | | 5/1978 | Gebhard |
| 4,635,361 A | * | 1/1987 | DeMars ...................... 30/41 |
| 4,653,188 A | * | 3/1987 | Kwak ......................... 30/41 |
| 4,753,006 A | * | 6/1988 | Howe ......................... 30/41 |
| 4,800,649 A | * | 1/1989 | Cataudella ................... 30/41 |
| 4,880,409 A | | 11/1989 | Winblad et al. |
| 4,888,188 A | | 12/1989 | Castner, Sr. et al. |
| 5,137,183 A | * | 8/1992 | Mikulec et al. ............. 222/192 |
| 5,178,302 A | * | 1/1993 | Cheng ........................ 222/102 |
| 5,305,928 A | | 4/1994 | Verdaguer |
| 5,402,697 A | * | 4/1995 | Brooks ......................... 83/18 |
| 5,447,255 A | | 9/1995 | Smedley ..................... 222/102 |
| 5,491,895 A | * | 2/1996 | Lee ............................. 30/125 |
| 6,102,254 A | * | 8/2000 | Ross ........................... 222/192 |
| 6,279,233 B1 | | 8/2001 | Cammeron |
| 6,675,482 B1 | * | 1/2004 | Gilbert et al. ................ 30/141 |
| 6,789,703 B2 | * | 9/2004 | Pierre-Louis ................ 222/101 |
| 7,210,600 B1 | * | 5/2007 | Delio, Jr. ..................... 222/92 |
| 7,374,046 B1 | * | 5/2008 | O'Brien ...................... 206/541 |
| 2008/0072432 A1 | | 3/2008 | Teys et al. |
| 2009/0108025 A1 | * | 4/2009 | deVirag et al. .............. 222/205 |
| 2010/0107415 A1 | * | 5/2010 | Kurzet ......................... 30/41 |

FOREIGN PATENT DOCUMENTS

FR 2 620 423 * 3/1989

* cited by examiner

*Primary Examiner* — Hwei-Siu C Payer

(57) ABSTRACT

An infant feeding system includes a spoon assembly with a scoop and a mount attached to and extending away from the mount. The mount has a distal end with respect to the scoop. An aperture extends into the distal end and into the scoop so that fluid flowing into the aperture is captured by the scoop. A tube has a nozzle thereon extendable in and fluidly couplable with the aperture. The tube has food therein so that food from the tube is ejected onto the scoop when the tube is squeezed.

4 Claims, 4 Drawing Sheets

INFANT FEEDING SYSTEM

BACKGROUND OF THE DISCLOSURE

Field of the Disclosure

The disclosure relates to infant feeding devices and more particularly pertains to a new infant feeding device for feeding an infant in a manner that positions food on a spoon like device without having to scoop such out of a secondary container.

SUMMARY OF THE DISCLOSURE

An embodiment of the disclosure meets the needs presented above by generally comprising a spoon assembly that includes a scoop and a mount attached to and extending away from the mount. The mount has a distal end with respect to the scoop. An aperture extends into the distal end and into the scoop so that fluid flowing into the aperture is captured by the scoop. A tube has a nozzle thereon extendable in and fluidly couplable with the aperture. The tube has food therein so that food from the tube is ejected onto the scoop when the tube is squeezed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
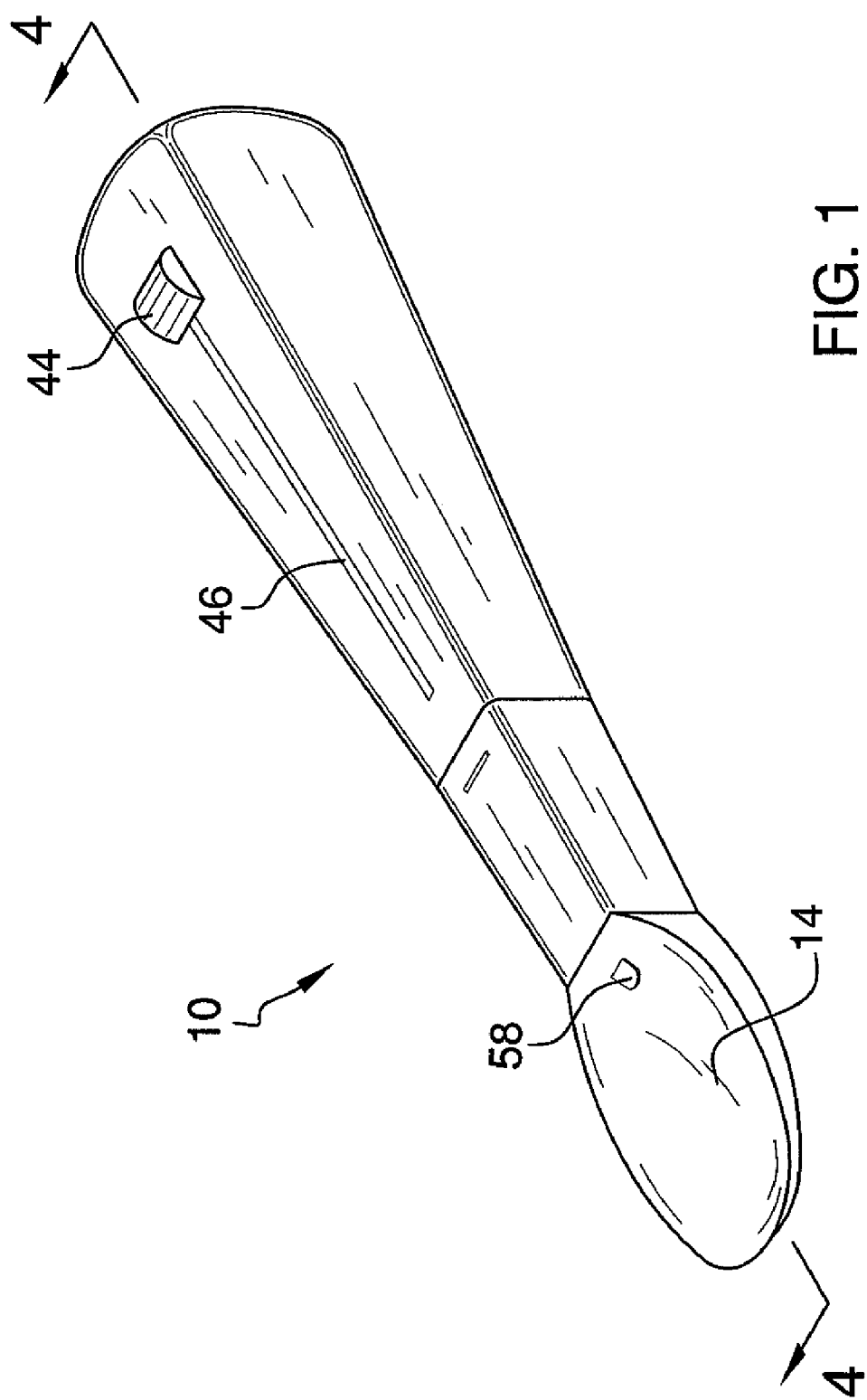
FIG. 1 is a top perspective view of an infant feeding system according to an embodiment of the disclosure.
Figure 2:
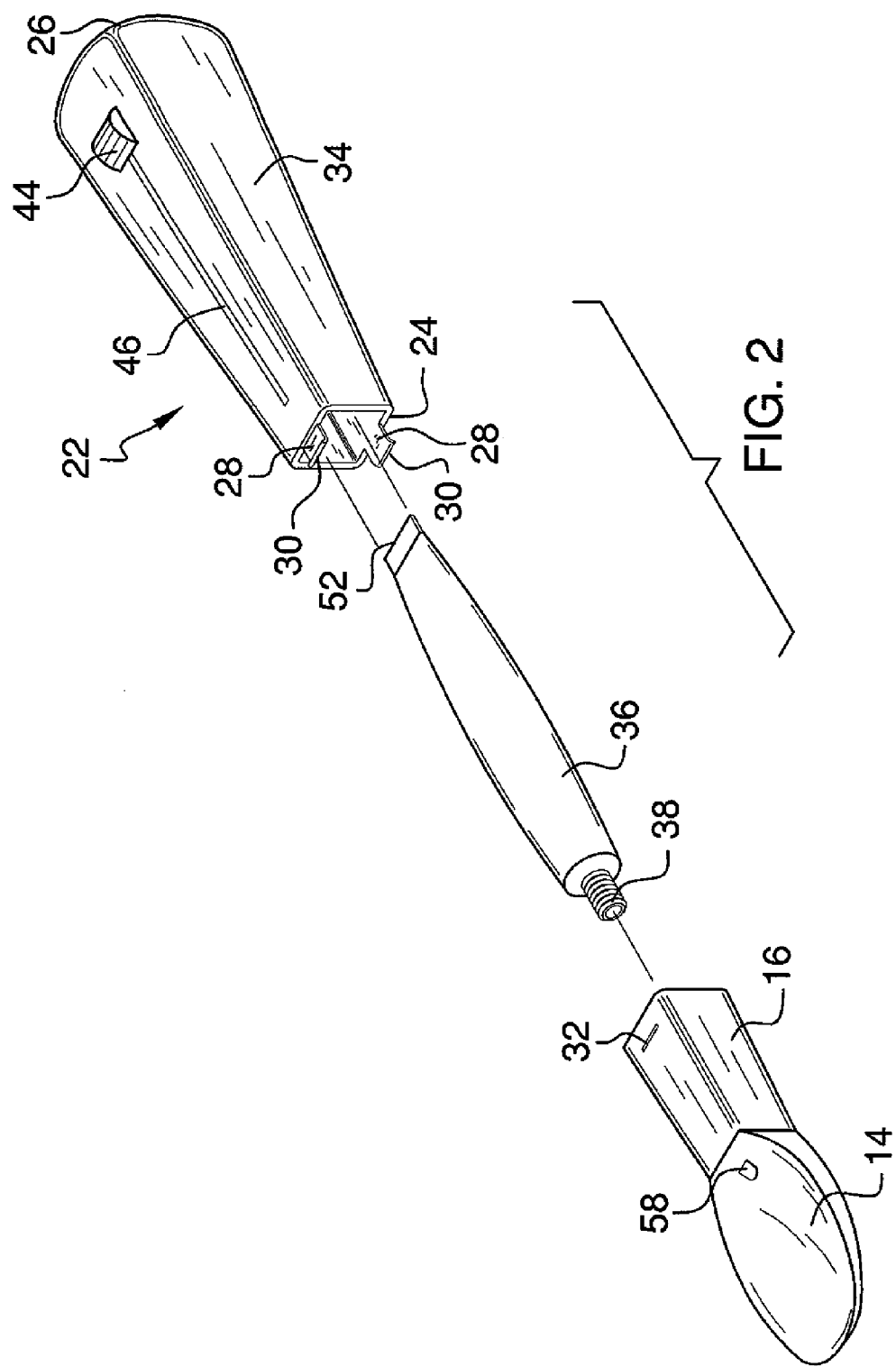
FIG. 2 is a top expanded perspective view of an embodiment of the disclosure.
Figure 3:
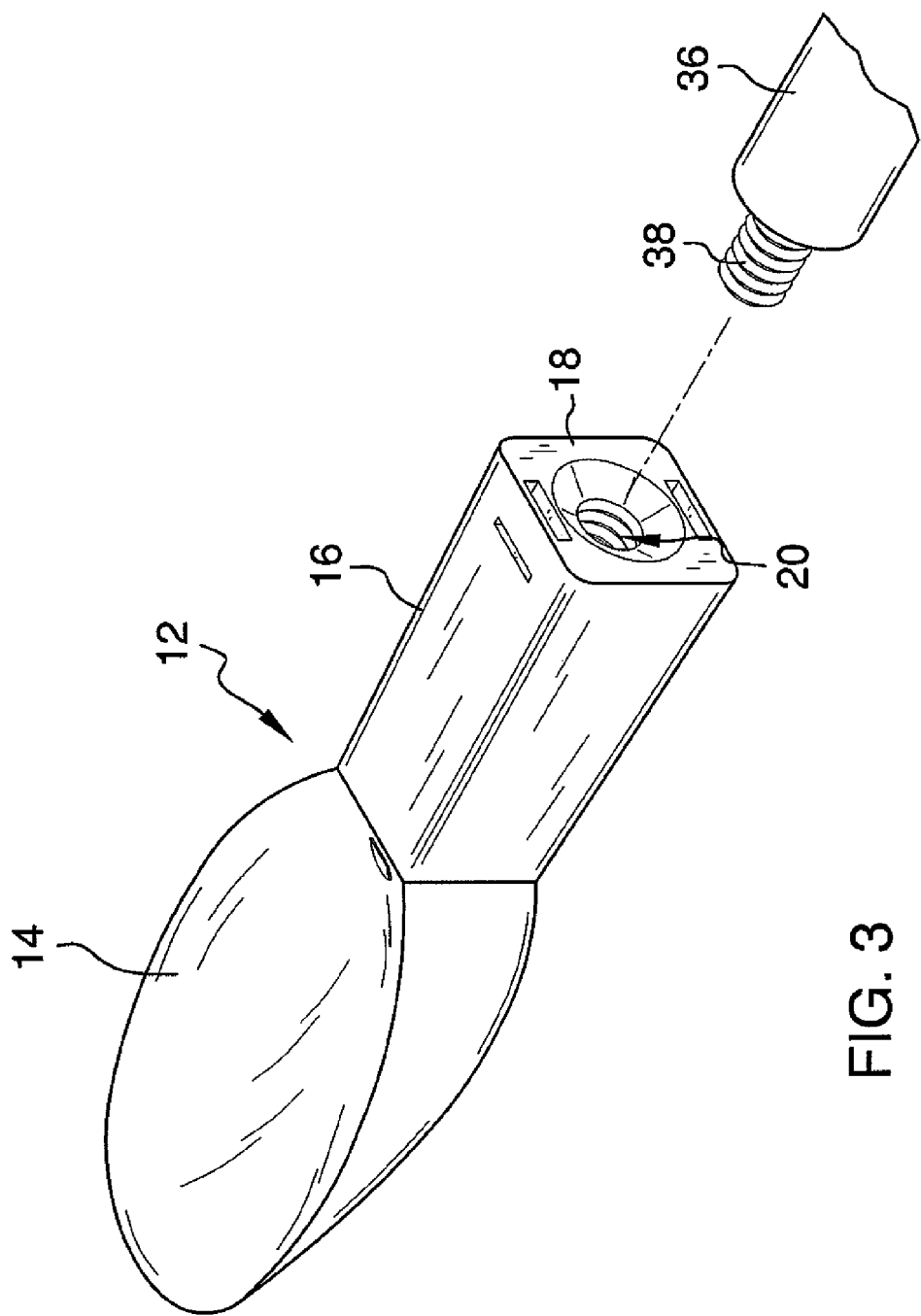
FIG. 3 is an enlarged rear perspective view of an embodiment of the disclosure.
Figure 4:
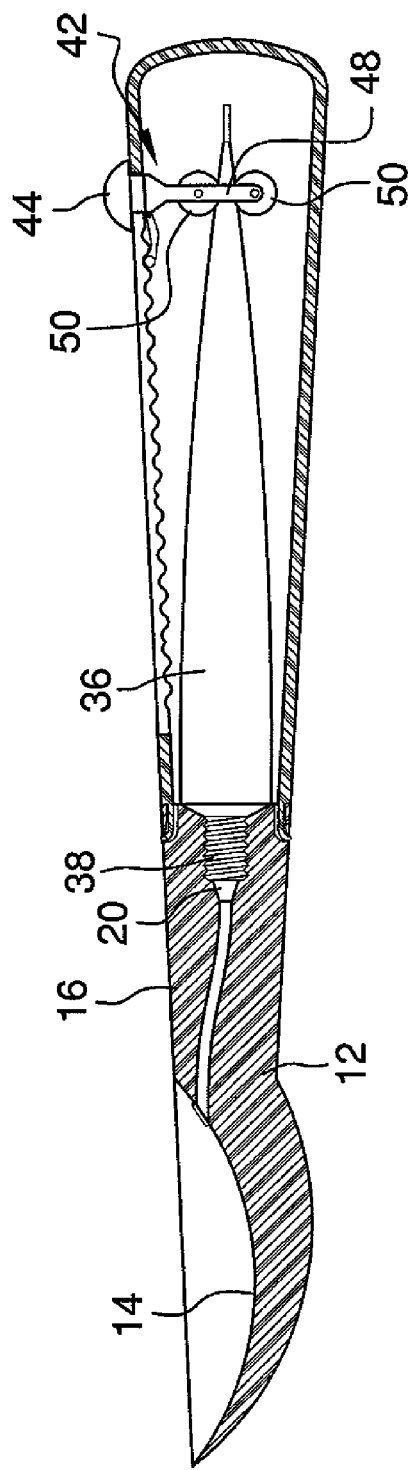
FIG. 4 is a cross-sectional view taken along line 4-4 of FIG. 1 of an embodiment of the disclosure.
Figure 5:
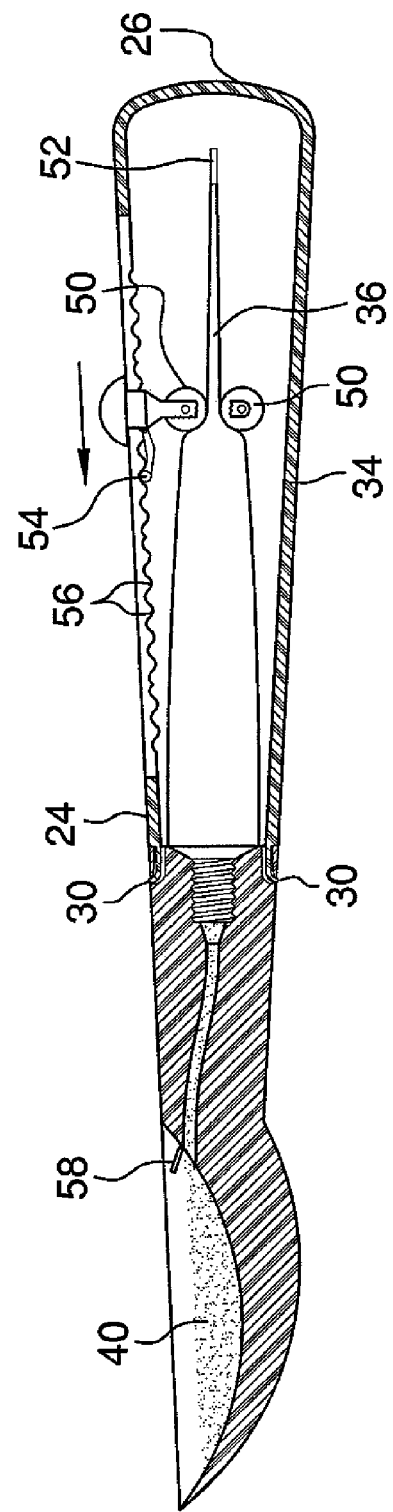
FIG. 5 is a broken cross-sectional view of an embodiment of the disclosure.

With reference now to the drawings, and in particular to FIGS. 1 through 5 thereof, a new infant feeding device embodying the principles and concepts of an embodiment of the disclosure and generally designated by the reference numeral 10 will be described.

As best illustrated in FIGS. 1 through 5, the infant feeding system 10 generally comprises a spoon assembly 12 including a scoop 14 and a mount 16 that is attached to and extends away from the scoop 14. The mount 16 has a distal end 18 with respect to the scoop 14. An aperture 20 extends into the distal end 18 and the scoop 14 so that fluid flowing into the aperture 20 is captured by the scoop 14.

A housing 22 has a first end 24 and a second end 26. The first end 24 is open and is removably coupled to the distal end 18. A coupler removably couples the first end 24 to the distal end 18. The coupler includes a pair of locking tabs 28 that are extendable into the distal end 18 and engaged with the mount 16. In particular, the tabs 28 include flanges 30 that extend into receivers 32 when locked to the mount 16 and which can be depressed to release the tabs 28 from the mount 16. The housing 22 has a peripheral wall 34 extending between the first 24 and second 26 ends.

A tube 36 has a nozzle 38 thereon extendable in and fluidly couplable with the aperture 20. The tube 36 has food 40 therein. The food 40 may be any conventional blended, mashed or otherwise conventional and typically viscous food feed to infants and toddlers. The nozzle 38 is threaded and is threadably coupled to the aperture 20. Food 40 from the 36 tube is ejected onto the scoop 14 when the tube 36 is squeezed. The tube 36 is covered by the housing 22 when the housing 22 is coupled to the mount 16.

A squeezing assembly 42 is mounted to the housing 22 and squeezes the tube 36 toward the nozzle 38 when the squeezing assembly 42 is actuated. The squeezing assembly 42 includes a finger actuator 44 mounted on the peripheral wall 34 adjacent to a slot 46 extending through the peripheral wall 34. The slot 46 is elongated along a line extending between the first 24 and second 26 ends. A bracket 48 is attached to the finger actuator 46 and extends downwardly through the slot 46 and into the housing 22. A pair of rollers 50 is rotatably coupled to the bracket 48. One of the rollers 50 is positioned between the other of the rollers 50 and the finger actuator 44. A closed end 52 of the tube 36 positioned opposite of the nozzle 38 is positioned between the rollers 50. The rollers 50 squeeze the tube 36 as the finger actuator 44 is moved toward the first end 24 to squeeze food out of the tube 36 and onto the scoop 14. A stop 54 is attached to the bracket 48 adjacent to an inner surface of the peripheral wall 34. The stop 54 is biased against the inner surface and slides into and outwardly of grooves 56 in the inner surface to allow for indexing of the movement of the finger actuator 44 and to retain it in place against back pressure from the tube 36.

In use, a tube 36 is selected depending on the type of food to be fed to a child. The tube 36 is coupled to the mount 16 and may be squeezed at this point to place food on the scoop 14. However, typically the housing 22 will be mounted onto the mount 16 while extending the closed end 52 between the rollers 50. The rollers 50 are then moved toward the scoop 14 with the finger actuator 44 to force food from the tube 36 onto the scoop 14. When the tube 36 is empty, the housing 22 is removed, the tube 36 removed from the mount 16 and the scoop 14 and mount 16 cleaned to remove any excess food material. A flap 58 biased in a closed position may be positioned over the aperture as it joins the scoop to prevent material from moving back into the aperture from the scoop.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An infant feeding system comprising:
  a spoon assembly including a scoop and a mount being attached to and extending away from said spoon, said mount having a distal end with respect to said scoop, an aperture extending into said distal end and said scoop so that fluid flowing into said aperture is captured by said scoop;
  a housing having a first end and a second end, said first end being open and being removably coupled to said distal end, a coupler removably coupling said first end to said distal end, said coupler including a pair of locking tabs being extendable into said distal end and engaged with said mount, said housing having a peripheral wall extending between said first and second ends;
  a tube having a nozzle thereon extendable in and fluidly couplable with said aperture, said tube having food therein, said nozzle being threaded and being threadably coupled to said aperture, wherein food from said tube is ejected onto said scoop when said tube is squeezed, said tube being covered by said housing when said housing is coupled to said mount;
  a squeezing assembly being mounted to said housing and squeezing said tube toward said nozzle when said squeezing assembly is actuated, said squeezing assembly including;
    a finger actuator mounted on said peripheral wall adjacent to a slot extending through said peripheral wall, said slot being elongated along a line extending between said first and second ends;
    a bracket being attached to said finger actuator and extending downwardly through said slot and into said housing;
    a pair of rollers being rotatably coupled to said bracket, one of said rollers being positioned between the other of said rollers and said finger actuator, a closed end of said tube positioned opposite of said nozzle being positioned between said rollers, said rollers squeezing said tube as said finger actuator is moved toward said first end to squeeze food out of said tube and onto said scoop.

2. An infant feeding system comprising:
  a spoon assembly including a scoop and a mount being attached to and extending away from said scoop, said mount having a distal end with respect to said scoop, an aperture extending into said distal end and said scoop so that fluid flowing into said aperture is captured by said scoop;
  a tube having a nozzle thereon extendable in and fluidly couplable with said aperture, said tube having food therein, wherein food from said tube is ejected onto said scoop when said tube is squeezed;
  a housing having a first end and a second end, said first end being open and being removably coupled to said distal end;
  said tube being covered by said housing when said housing is coupled to said mount
  a squeezing assembly being mounted to said housing and squeezing said tube toward said nozzle when said squeezing assembly is actuated, said squeezing assembly including;
    a finger actuator mounted on a peripheral wall of said housing adjacent to a slot extending through said peripheral wall, said slot being elongated along a line extending between said first and second ends;
    a bracket being attached to said finger actuator and extending downwardly through said slot and into said housing; and
    a pair of rollers being rotatably coupled to said bracket, one of said rollers being positioned between the other of said rollers and said finger actuator, a closed end of said tube positioned opposite of said nozzle being positioned between said rollers, said rollers squeezing said tube as said finger actuator is moved toward said first end to squeeze food out of said tube and onto said scoop.

3. The system according to claim 2 wherein a coupler removably couples said first end to said distal end, said coupler including a pair of locking tabs being extendable into said distal end and engaged with said mount, said housing having a peripheral wall extending between said first and second ends.

4. The system according to claim 2, wherein said nozzle is threaded and is threadably coupled to said aperture, wherein food from said tube is ejected onto said scoop when said tube is squeezed.

* * * * *